United States Patent [19]

Franges

[11] 3,912,140

[45] Oct. 14, 1975

[54] CARRYING HANDLE FOR PACKAGES OR THE LIKE

[76] Inventor: Hoton M. Franges, 20 E. 35th St., New York, N.Y. 10016

[22] Filed: Nov. 30, 1973

[21] Appl. No.: 420,611

[52] U.S. Cl.............. 224/45 P; 16/110 R; 16/114 P; 150/12; 224/56; 229/54 R; 294/27 H
[51] Int. Cl.² ........................................ B65D 63/18
[58] Field of Search............ 294/16, 27 R, 27 H, 28, 294/33; 16/110 R, 110.5, 114 R, 114 B; 150/12; 220/94 R, 94 A, 96; 224/45 R, 45 Q, 45 T, 55, 56, 57; 229/52 R, 52 A, 52 AC, 52 AL, 54 R

[56] References Cited
UNITED STATES PATENTS

| | | | |
|---|---|---|---|
| 1,781,583 | 11/1930 | Hodgson............................ | 224/57 X |
| 2,319,147 | 5/1943 | Mason............................... | 16/114 R |
| 2,364,105 | 12/1944 | Socke................................ | 16/110 R |
| 2,547,343 | 4/1951 | O'Loughlin.......................... | 224/57 |
| 2,717,411 | 9/1955 | Taipale.............................. | 16/114 B |
| 3,083,366 | 3/1963 | Franges............................. | 224/56 X |
| 3,529,317 | 9/1970 | Schwarzkopf....................... | 229/54 R X |
| 3,692,218 | 9/1972 | Friedman........................... | 229/54 R X |

*Primary Examiner*—Evon C. Blunk
*Assistant Examiner*—Johnny D. Cherry
*Attorney, Agent, or Firm*—Donald D. Jeffery

[57] ABSTRACT

A carrying handle for packages, shopping bags or the like having wire or rope handles, characterized principally by elongated side walls which can be locked or latched when the carrying handle is to be used. Means are provided for retaining the wire or rope handle, including, in one form, retainer sections having abutting surfaces when the side walls are latched, and, in another form, lateral retainer members carried by one of the side walls and which can be pivoted into the interior of the carrying handle defined by the side walls. In the latter form, the retainer members are distorted or squeezed when moved between the side walls thereby preventing inadvertent withdrawal of the wire or rope handle from the carrying handle.

16 Claims, 13 Drawing Figures

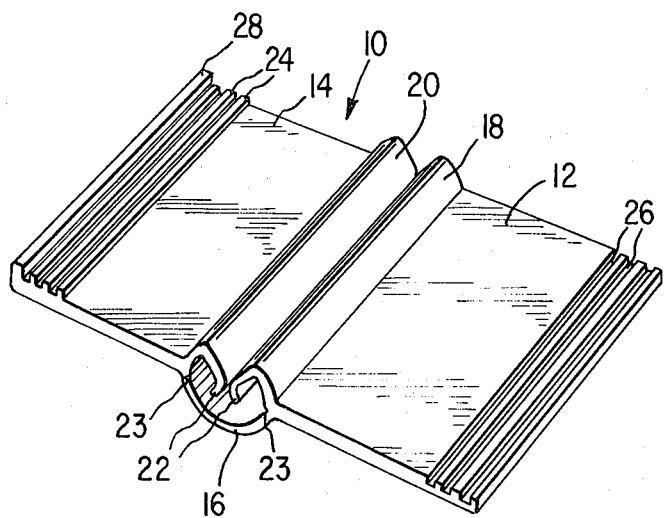
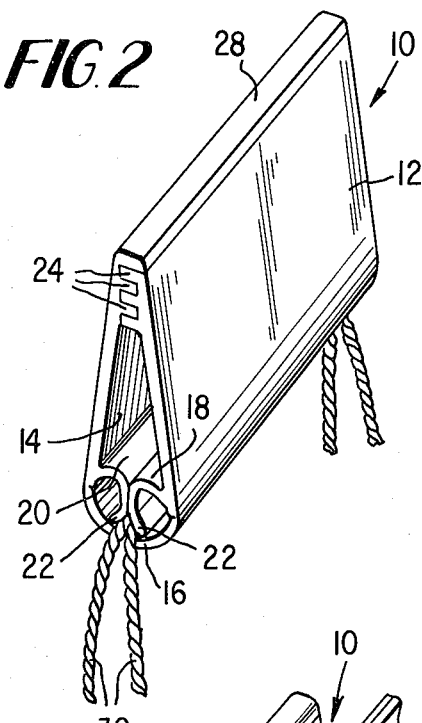
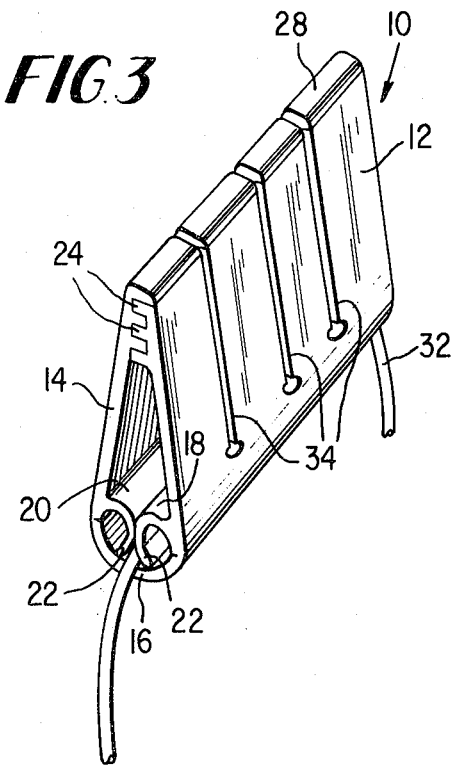
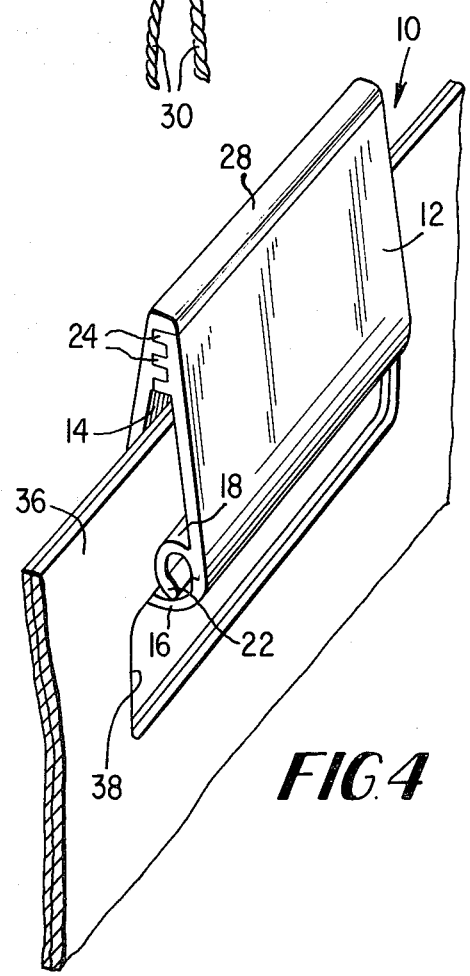

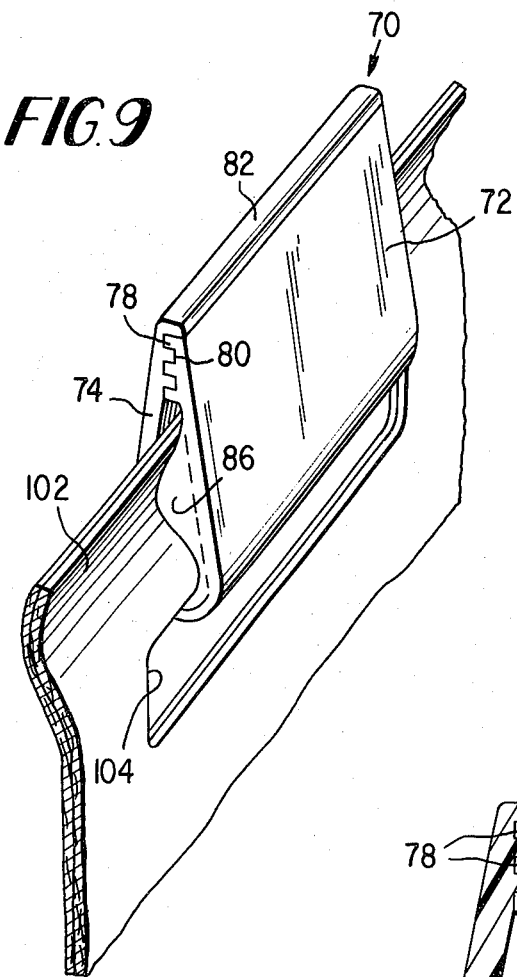
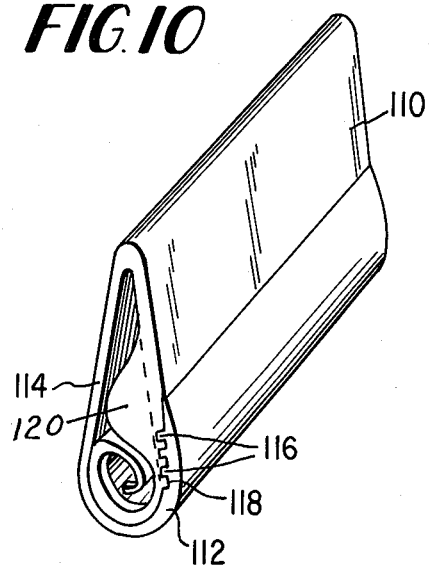
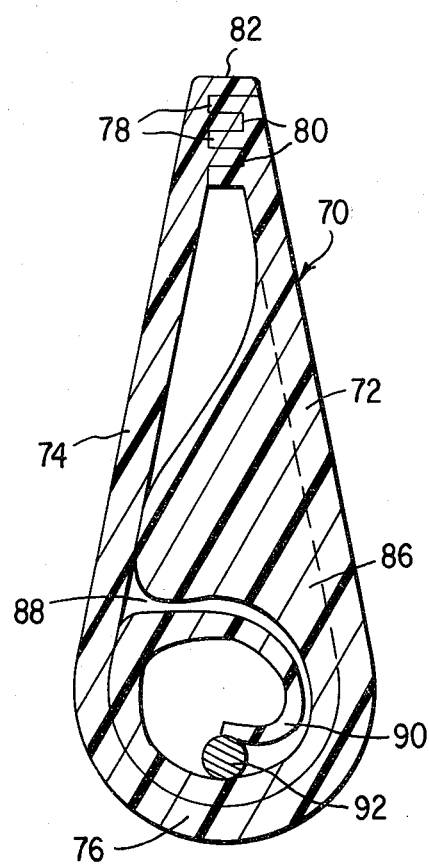

CARRYING HANDLE FOR PACKAGES OR THE LIKE

BACKGROUND OF THE INVENTION

1. Field of the Invention

The present invention relates as indicated to a carrying handle for packages or the like, and relates more particularly to a carrying handle which is versatile in its application whereby the same may be used with packages or bags having rope or plastic handles, bags having openings at the top by means of which the bag can be grasped and held by the user, and pails or cans, such as paint cans, normally provided with a carrying handle attached to the pail or can. All forms of the present invention can be used interchangeably with any of these noted carrying means, with the carrying handle in accordance with the present invention functioning to provide a supplemental handle which is easy to apply and easy to carry. The handle is preferably made of a flexible and resilient plastic material, and can be easily extruded or molded. When not in use, the carrying handle can be layed flat so as to take up a minimum of space, and when use of the carrying handle is desired, the handle can be quickly associated with the carrying article and locked so as to permit carrying of the articles in a significantly easier and more comfortable fashion than with the handle provided of the article, such as a bag, package, pail or the like.

1. Description of the Prior Art

Many forms of carrying handles have been designed to supplement the handles normally associated with shopping bags, wrapped packages, pails, cans or the like. Such supplemental handles are normally primarily designed for use with one of the aforementioned articles, and are not designed nor will they function satisfactorily with all of the mentioned articles. Typical handles are temporarily attached to or associated with the carrying means of the article itself and tend to become dislodged from the carrying means when the package or bag is set down. Due to their relatively small size, carrying handles of the type referred to have tended to become lost when not in use thereby requiring inconvenient replacement.

Typical examples of prior art carrying handles are illustrated in numerous issued patents, one of which is applicant's prior U.S. Pat. No. 3,083,366, which discloses a hand protecting handle which may be permanently attached to the loop handles of shopping bags or may be separately provided and removably attached to the loop handles. Although the handle is readily conformable to the hand of the user, it has definite limitations as to the field of use, and has the decided disadvantage in being easily dislodged from the loop handles when the bag is laid down.

Further examples of prior art handles of this general type are disclosed in U.S. Pat. No. 3,657,765, specifically designed for application to packages having binding cord extending there around; U.S. Pat. No. 3,149,367 which also relates to a package carrier for use with package cord or twine extending around a package; U.S. Pat. No. 2,364,105, which relates to a specifically designed handle for use with a metal container or can; U.S. Pat. No. 1,781,583, which relates to a handle grip for use with pails; and U.S. Pat. No. 1,468,848, which relates to a handle for use with market or grocery bags. Although such handles are generally satisfactory for the use intended, they all possess the above noted disadvantage of being easily dislodged from the carrying means for the article, and they suffer the important disadvantage of not being adapted for general use for all the various carrying functions referred to above.

SUMMARY OF THE PRESENT INVENTION

With the above in mind, the principal object of the present invention is to provide a carrying handle which is constructed and arranged to achieve the utmost versitility in use. In all forms of the invention, the carrying handle can be easily and quickly adapted to the article to be carried and closed or locked to secure the carrying handle to such article until intentionally disengaged and removed from such article. The article can thus be temporarily set down without fear of the carrying handle becoming dislodged and possibly lost.

A further object of the present invention is to provide a carrying handle which can be easily extruded or molded of conventional plastic material having the requisite flexibility and resiliency. The flexibility of the handle permits the same to readily conform to the hand of the user, and the resiliency permits the handle to be unfolded to an essentially flat condition for ease of storage until used again. The handle is without sharp edges or rims and can therefore be used without fear of cutting or otherwise damaging the hand of the user.

A still further object of the present invention is to provide a carrying handle having essentially smooth and relatively long side wall portions. The side walls provide a continuous flat, smooth surface conveniently accessible for printing thereby permitting advertising or other esthetic designs to be placed on the exposed surfaces of the walls. The handles are thus well suited for department or other type retail stores which could supply such carrying handles to customers to facilitate the carrying of packages purchased at such stores.

A still further object of the present invention is to provide a carrying handle which is locked in two respects to the article to be carried. The retaining section or sections of the carrying handle receive the rope or similar carrying means in such a manner to prevent inadvertent disengagement of such carrying means from the carrying handle. Secondly, the carrying handle is provided with closure means on the respective side walls which cooperate to securely fasten such side walls together when the handle is used. This further prevents disengagement of the carrying handle from the article. The closure means for the side walls can take several forms with the preferred form comprising a series of mating ribs and grooves formed on the confronting surfaces of the side walls, with the ribs being latched or locked in the grooves of the adjoining side wall thereby detachably connecting the side walls. To remove the handle following use, the ribs are simply disengaged from the grooves, the side walls unfolded and the carrying handle detached from the rope handle, pail wire, or the like supplied with the article.

Briefly described, the present invention comprises essentially two forms, one of which includes latching or retainer sections centrally of the carrying handle which partially define a retaining area for the rope handles or the like. When the side walls are folded toward each other and locked, the retaining members are distorted so as to trap the loop handle or the like in the retainer section of the carrying handle. The second form of the invention essentially comprises a handle having elongated side walls one of which is formed with lateral closure members hinged to the edges thereof, which closure members can be folded to a position generally perpendicular to such side wall when the handle is to be used. The lateral closures are provided with curved passages through which the rope handles or the like can pass for retention by the carrying handle when the side walls are adjacently positioned and locked.

BRIEF DESCRIPTION OF THE DRAWINGS

FIG. 1 is a perspective view of one form of carrying handle in accordance with the present invention, with the handle being shown flat;

FIG. 2 is a handle of FIG. 1 shown folded and in use, with ropes extending through the retainer section of the handle;

FIG. 3 is a view similar to FIG. 2 showing a slightly modified form of carrying handle in which the side walls are formed with longitudinal openings to improve the flexibility of the handle;

FIG. 4 is a handle illustrated in FIGS. 1 and 2, shown applied to a bag having a carrying opening therethrough near the top thereof;

FIG. 9 is a view similar to FIG. 7, showing the manner in which the carrying handle may be applied to a bag having a carrying opening rather than a handle;

FIG. 10 is a view of the FIG. 6 form of the invention, provided with a somewhat modified form of closure means, FIG. 11 is an enlarged sectional view through the carrying handle of FIG. 7, showing in greater detail the distortion of the closure members when the handle is closed and locked;

DETAILED DESCRIPTION OF THE PREFERRED EMBODIMENTS

Figure 5:
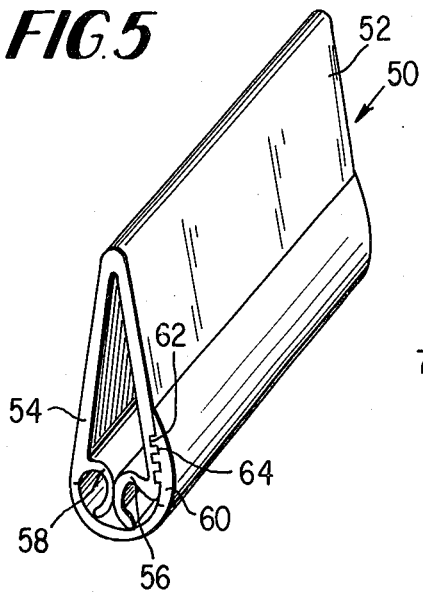
FIG. 5 is a view similar to FIG. 2 showing a modified version of closure means associated with the respective side walls.

Referring now in more detail to the application drawings, wherein like parts are indicated by like reference numerals, and initially to the form of the invention illustrated in FIGS. 1, 2 and 4, the carrying handle is generally indicated at 10 and comprises side walls 12 and 14 which are separated by and integrally connected to a semicylindrical center section 16. Also integrally formed with each side wall 12 and 14 are generally C-shaped retainer sections 18 and 20, respectively. The free ends of the segments 18 and 20 are commonly designated at 22 and are directed toward the adjacent surface of the semicylindrical section 16. Just above such free ends, the segments are in confronting abutment and collectively define an entrance channel approximately 90° in transverse dimension.

The FIG. 1 form of the invention is preferably formed of a flexible and resilient plastic material, and can be easily extruded by presently known extrusion techniques. Examples of available materials well suited to the present invention are polyethylene and polyvinyl chloride, although it will be understood that other materials possessing the necessary characteristics may also be employed. The flexibility of the segments 18 and 20 permits the abutting surfaces of the segments 18 and 20 to be separated thereby permitting ropes, as in FIG. 2, a single rope or wire as in FIG. 3, or a shopping bag as in FIG. 4, to be inserted either through or between the segments, as the case may be.

Side wall 14 is formed adjacent its outer end with a series of ribs commonly designated at 24, and side wall 12 is formed with a series of mating grooves 26. The ribs and grooves are dimensioned so that the ribs fit tightly in the grooves of the other side wall when the side walls are moved to confronting abutment as shown in FIG. 2. The flexibility of the plastic material facilitates the mating of the ribs and grooves and the retention afforded by said connection. The wall 14 is formed with an end flange 28 which overlies the end of the wall 12, as shown in FIGS. 2 and 4.

The manner in which the carrying handle of FIG. 1 is used should be apparent from the above description. With the handle in its flat, stored position, the rope or wire handle, shown at 30 in FIG. 2 and 32 in FIG. 3, respectively, is moved downwardly through the channel defined by the retainer segments 18 and 20 into the retaining area below such segments and defined by the semicylindrical section 16 of the handle. The side walls 12 and 14 are thereafter moved toward each other to a closed position, with the ribs 24 on side wall 14 tightly frictionally engaging the grooves 26 on the opposed side wall 12, with such closed position being shown in FIG. 2. The end flange 28 provides a smooth surface at the top of the handle, and the semicylindrical section 16, being of smooth contour, provides a comfortable gripping surface for carrying the handle and thus the article or package.

It will further be noted, referring to FIG. 2, that as the side walls 12 and 14 move to a closed position, the retainer sections 18 and 20 pivot downwardly about an axis generally at the juncture of the side walls and the retainer segments so as to contact the semicylindrical section 16. The area of contact between the retainer sections is likewise increased due to the spacing between the side walls when closed. Thus, the hinging action of the retainer segments 18 and 20 effectively serves to lock the rope or wire handles 30 and 32 respectively, in the area defined by the ends of the retainer segments and the semicylindrical section 16, as clearly evident in FIGS. 2 and 3. To facilitate movement of side walls 12 and 14 relative to the center section 16, grooves 23 are formed in the section 16 just below the juncture thereof with the side walls.

It will thus be seen that the handles 30 and 32 are prevented from becoming disengaged from the carrying handle in two essential respects. First, the tight locking action provided by the retainer segments 18 and 20 when the side walls are closed, and, second, the locking action afforded by the closure ribs 24 when the side walls are closed. Thus, the article being carried can periodically be put down if desired without fear of the carrying handle becoming dislodged from the article handle or handles. In this regard, it will be noted that although two roped handles 30 and a wire handle 32 have been shown in FIG. 3, it willl be understood that other type handles, or twine enclosing a wrapped package, can also effectively be associated with the carrying handle of the present invention.

Referring to FIG. 3, the carrying handle in this form is provided with a series of longitudinal grooves commonly designated at 34 which extend through the thickness of each side wall 12 and 14, with only grooves 34 in side wall 12 being illustrated in FIG. 3. The carrying handle shown in this figure is otherwise identical to the carrying handle shown in FIGS. 1, 2 and 4, and the longitudinal grooves are provided to facilitate transverse flexing of the handle in the gripping region thereof thereby more readily to conform with the hand of the user.

Referring to FIG. 4, the carrying handle 10 is shown associated with a shopping bag 36 having an opening 38 formed therein near the top by which the bag is normally carried by the user. To use the carrying handle 10 of the present invention with a shopping bag of this type, the carrying handle is simply positioned through the openings 38 in flat condition and the section of the bag immediately above the opening 38 moved downwardly through the channel defined by the retainer segments 18 and 20. The side walls 12 and 14 are then closed and locked, with the retainer segments, due to the above described hinging action when the side walls are closed, serving to resiliently clamp the section of the bag therebetween. The bag is thus tightly frictionally engaged by the retainer segments, with the locked side walls serving to supplement the mount of the carrying handle on the bag. To disengage the carrying handle 10 from the bag, the ribs 24 are disengaged from their mating grooves, the side walls opened, and the retainer segments withdrawn from engagement with the section of the bag above the opening 38. This same method of disengagement applies as well to the uses shown in FIGS. 2 and 3.

Referring to FIG. 5, the carrying handle 50 as shown therein is similar in most respects to the carrying handle 10 previously described. However, in this form of the invention the closure for the side walls 52 and 54 is relatively adjacent the bottom of the handle. As in the previous form, the side walls 52 and 54 are formed with retainer segments 56 and 58, respectively, with the side wall 54 being relatively elongated and terminating in a free end section 60 which is tapered at its tip and which encloses the bottom of the carrying handle and provides a smooth semicylindrical surface. The free end portion 60 of the wall 54 and the wall 52 are provided with ribs and grooves 62 and 64 respectively whereby the side walls can be detachably locked in the same manner above described. The dimensions of the retainer sections 56 and 58 and the spacing of the side walls 52 and 54 when locked is such that the retainer segments are in resilient abutment along a substantial surface area thereby confining a rope or wire handle in the area defined by the retainer segments and the bottom curved portion of wall 52.

The manner in which the FIG. 5 form is used will be apparent. When the walls are unlocked and the free end portion 60 of wall 52 dropped, the handle to be supported is placed below the retainer segments 56 and 58, and the free end 60 is thereafter closed and locked.

Due to the biased, frictional engagement of the retainer segments, the rope or wire handle of the article to be carried is confined below the segments and within the curved lower portion of the wall 52. When the carrying handle 50 is disengaged from the article, the handle may be folded flat for convenient storage until further use.

Figure 12:
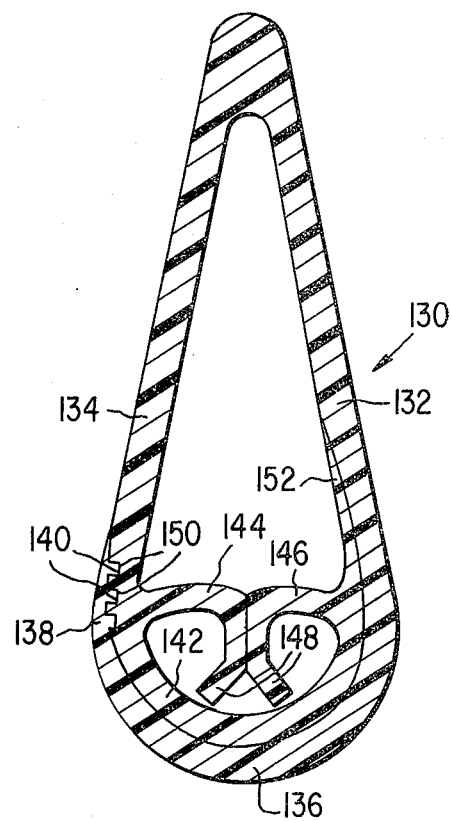
FIG. 12 is a sectional view of a further form of the invention, with the side walls having a different construction.
Figure 13:
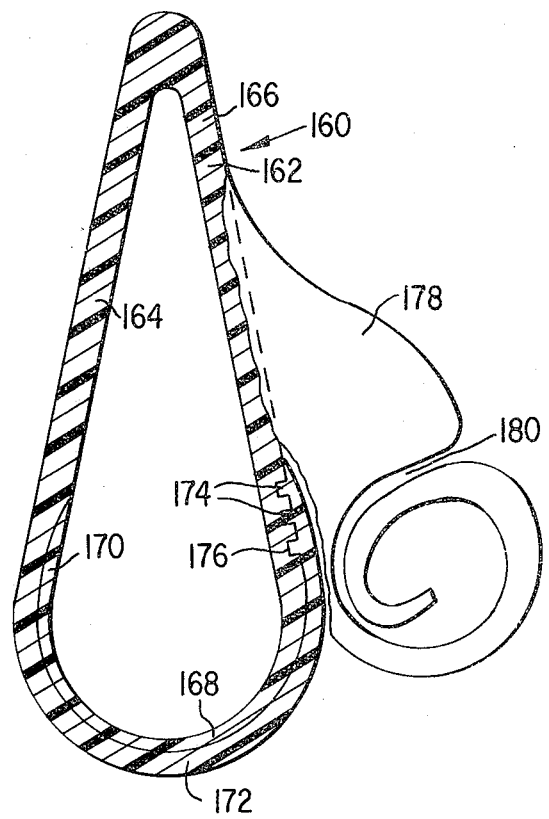
FIG. 13 is a sectional view of a still further form of the invention, with the lateral closure or retainer being shown in a non-use position and partially broken away to show the closure means.

Reference is now made to FIGS. 6–9 and 11 which illustrate a modified form of carrying handle in accordance with the present invention. The carrying handle is generally indicated at 70 and is shown flat in FIG. 6, except for one of the lateral retaining members, and folded in use in FIGS. 7, 9 and 11, with FIG. 11 comprising an enlarged sectional view showing the manner in which the handle of the article is securely retained by the carrying handle. As in the FIGS. 1–5 form of the invention, the carrying handle illustrated in FIGS. 6–9 and 11 and also in the remaining FIGS. 10, 12 and 13 is made of a suitable thermoplastic material, for example, polyethylene or polyvinyl chloride.

Figure 6:
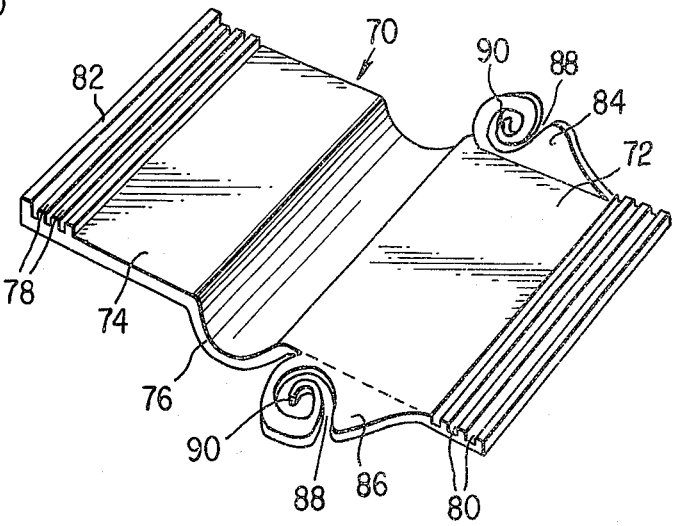
FIG. 6 is a perspective view of an alternative form of carrying handle in accordance with the present invention, with the handle being shown flat.

Referring to FIG. 6, the carrying handle 70 includes side walls 72 and 74 and a central, semicylindrical section 76 which integrally connects the side walls. Each side wall is formed in the same manner as above described, with ribs 78 and mating grooves 80 for locking the side walls, with the side wall 74 also including an end flange 82 which overlies the side wall 72 when the carrying handle is closed, as shown in FIG. 7.

Extending laterally from the respective sides of the side wall 72 are lateral retaining members 84 and 86 which are identical in construction. Each retaining member 84 and 86 is hinged to the side wall 72 for hinged movement between the flat position shown in FIG. 6 and a position normal or slightly exceeding normal to the plane of the side wall 72. The flexibility of the plastic material employed for the carrying handle permit such hinge movement, and to facilitate the same, the lateral retaining members 84 and 86 may be reduced somewhat in thickness.

Each retaining member is formed with a curved passage commonly designated at 88 through which a handle or handles of the article to be carried can be inserted when the handle is to be used. The passageway at its termination is defined by a hook like portion 90 of the retainer member which functions in the manner to be presently described to confine the handle or handles within the retaining member when the carrying handle is employed.

Figure 7:
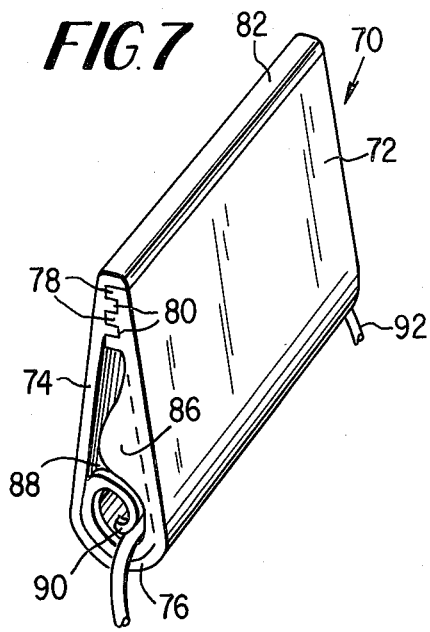
FIG. 7 is a perspective view of the handle of FIG. 6, shown applied to a wire or rope handle.
Figure 8:
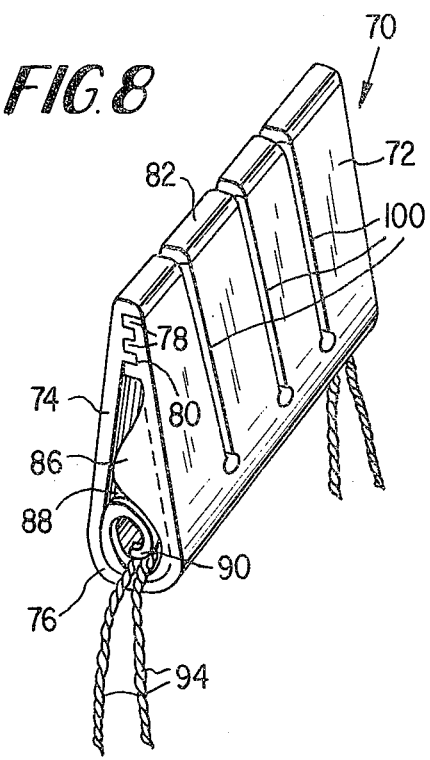
FIG. 8 is a view similar to FIG. 7, showing a modified form of handle in which the side walls are formed with longitudinal grooves.

To employ the carrying handle 70 with a wire handle 92 or a rope handle 94, shown respectively in FIGS. 7 and 8, the wire handle 92, for example, is inserted through the passages 88 of the retainer member when the same are in a flat position in the plane of the side wall 72. It should be noted that the retaining member 84 is shown in FIG. 6 in a rotated position generally normal to the side wall 72. The handle 92 traverses the passages 88 and preferably extends beyond the hook like end section 90 into the interior of the retaining members. The retaining members are thereafter pivoted about an axis through their connection to the side wall to a position generally normal, or slightly beyond normal to the side wall 72, as will be seen in FIGS. 7 and 8. The side walls 72 and 74 are thereafter moved toward each other and locked through engagement of the ribs 78 and grooves 80 as previously described.

As can perhaps best be seen in FIG. 11, the lateral retaining members, with member 86 being shown in FIG.

11, are contained within the semicylindrical central section 76 and the adjoining regions of the side walls 72 and 74. The dimensions of the lateral retaining members 84 and 86 are so selected that the retaining members are in fact distorted or squeezed when the side walls are closed thereby constricting the passage 88 thus preventing the handle 92 of the article from inadvertent movement outwardly of the passage 88. The handle is thus secured without escape in the lateral retaining members, with the locking of the side walls at the top thereof further preventing inadvertent disengagement of the carrying handle 70 from the handle of the article. The folding of the lateral retaining members slightly more than 90°, together with the distorting of the members when the side walls are closed, prevents outward movement of the retaining members when the handle is in use. As indicated, the plastic material employed and the thickness of the lateral retaining members permits repeated folding movement of the same without significant weakening of the hinge joint.

Referring to FIG. 8, the carrying handle 70 shown in this figure is identical with the carrying handle of FIGS. 6 and 7 except for the provision of longitudinal grooves commonly designated at 100 formed in both the side walls 72 and 74 to enhance the transverse flexing of the carrying handle so as to conform more readily to the hand of the user. Other parts of the carrying handle 70 in FIG. 8 are identical and have been so indicated by like reference numerals.

FIG. 9 illustrates the carrying handle 70 in use with a shopping bag 102 having a carrying opening 104 near the top thereof. The section of the bag above the opening 104 is inserted through the passages 88 after the same have been folded generally normal to the plane of the side wall 72, with the side walls being thereafter locked as above described. The bag is thus tightly frictionally engaged by the lateral retaining members.

Referring to FIG. 10, there is shown therein a modified form of locking the side walls, with such locking being generally similar to that shown in FIG. 5 in connection with the previously described form. Thus, the side wall 110 and the free end 112 of the side wall 114 are formed with mating ribs and grooves 116 and 118, respectively, for locking the side walls when the carrying handle is to be used. The side wall 110 is similarly provided with lateral retaining members 120 which function in the same manner as retaining members 86 previously described.

Referring now to the form of the invention illustrated in FIG. 12, the carrying handle comprising this form is generally indicated at 130 and comprises elongated side walls 132 and 134 which are integrally joined at their upper end during the formation of the handle, which is preferably by an extrusion process. The wall 132 includes a generally semicylindrical bottom section 136 which terminates in a tapered end portion 138 formed with ribs commonly designated at 140. The extreme end of the wall tapers generally to a point as shown in order to merge with the adjoining surface of wall 134 to form an essentially smooth exterior contour.

The side wall 134 includes a generally semicylindrical bottom section 142 and retainer segments 144 and 146, both of which are generally C-shaped in cross section and provided with free end portions commonly designated at 148 which define with the semicylindrical section 142 a retaining area for the rope or wire handles or the like.

The side wall 134 in the area thereof confronting the ribs 140 is formed with grooves 150 in which the ribs 140 can be frictionally engaged for locking or latching the side walls together when the carrying handle is in use. The free end 152 of the side wall 134 is tapered as shown to compliment the tapered section of the side wall 132 whereby the handle when in a closed position provides side walls of uniform thickness. It will further be noted that the semicylindrical container section 142 of the side wall 134 is substantially thinner than the semicylindrical section 136 of the side wall 132 which encloses the same when the handle is in use.

As shown in FIG. 12 the retainer segments 144 and 146 are in continuous confronting abutment along a substantial area thereof, and the retainer sections are dimensioned so as to be biased toward each other when the carrying handle is closed. The rope or wire handle is thus confined to the retaining area adjacent the free ends 148 of the retaining members.

In use of the FIG. 12 form of the invention, the side wall 132 is separated from the side wall 134 so as to permit insertion of the handle of the article over the surface of the tapered section 152 of the side wall 134 and downwardly toward the retainer sections 144 and 146. The tapered section 152 and the main wall section of the side wall 134 directly opposite such tapered section are then forced apart manually thereby defining a passage between the confronting faces of the retainer segments 144 and 146 thereby permitting positioning of the handle in the described retaining area. The free end 136 of the side wall 132 is thereafter wrapped around the semicylindrical section 142 and the side wall 134, and the ribs 140 engaged in the grooves 150 thereby to lock the side walls together. The handle of the article is thereby prevented from becoming inadvertently dislodged from the carrying handle not only due to the confined and closed retaining area but owing to the latched condition of the side walls, thereby providing a highly effective carrying handle. The semicylindrical section 136 provides a smooth surface by which the handle can be grasped by the user.

Referring now to FIG. 13, there is illustrated therein a further modification of the invention having lateral closures of the type illustrated in FIG. 6. In the FIG. 13 form, the carrying handle is generally indicated at 160 and comprises elongated side walls 162 and 164 which are integrally connected at their upper adjoining ends, as shown at 166. The side wall 162 is formed with a bottom, generally semicylindrical section 168 which is relatively thinner than the main portion of the side wall and tapered to a point at the extreme free end 170 thereof. Likewise, the side wall 164 is formed with a semicylindrical lower section 172 which is wrapped around the section 168 of the side wall 162 as shown in FIG. 13. The end of the section 172 tapers in thickness to provide a smooth transition with the outer surface of side wall 162, and is formed with a plurality of transversely extending ribs commonly designated at 174 which are received in mating grooves 176 formed in the side wall 162 whereby the side walls may be locked in essentially the same manner as above described with particular reference to other forms of the invention.

The side wall 162 is formed with a pair of lateral retaining members 178, only one of which is visible in FIG. 13, which members are similar in configuration and function to members 84 and 86 of the handle 70 illustrated in FIG. 6. The members 178 are hinged to the side wall 162 for pivotal movement between the position shown in FIG. 13 and a position between the side walls when the same are closed, as shown in FIGS. 7 and 8. As in the previous forms, the dimension of the members 178 is such as to slightly squeeze the same when disposed or tucked in between the side walls thereby restricting the passageway 180 and preventing withdrawal of the wire or rope handle. When disposing the lateral closures 178 within the side walls of the carrying handle, the same are preferably rotated more than 90° so as to prevent unintended movement of the retaining members outwardly of the side walls when the handle is in use.

To use the carrying handle 160 illustrated in FIG. 13, the wire or rope handle is inserted through the passage 180 and the lateral closures are pivoted to a position generally normal to the side wall 162, facing inwardly. The free end of side wall 164 is then wrapped around the semicylindrical section 168 of the side wall 162 and the side walls are locked by the mating ribs and grooves 174 and 176, respectively. The lateral retaining members 178 are then tucked in further so as to prevent withdrawal thereof, with the side walls being dimensioned so as to distort or squeeze the lateral retaining members and the passage 180 thereby retaining the rope or wire handle in the lateral retaining members.

It will be apparent that the described invention can be modified without departing from the invention concepts. In FIG. 1, for example, the retainer sections 18 and 20 could be omitted whereby the wire or rope handle is received directly in the semicylindrical section 16, with the side walls being hinged about the semicylindrical section and latched at their respective free ends. Such a modified carrying handles thus provides certain of the described advantages of the invention without, however, providing the locking feature afforded by the retainer segments.

The same comments apply with respect to FIG. 6 wherein the lateral retaining members 84 and 86 could be eliminated with consequent loss of latching capacity. The semicylindrical section 76 interconnecting the side walls provides the smooth rounded carrying surface for the handle and also functions to receive the wire or rope handle of the article to be carried, with the side walls being latched at their free ends as shown. In the same manner, the FIGS. 12 and 13 forms of the invention could also be modified by deleting the retainer members, with the latching being modified by deleting the retainer members, with the latching being effected as shown and a smooth carrying section of the handle still provided.

Although in all the described and illustrated forms, ribs and mating grooves have been depicted for the closure of the side walls and carrying handle, it will be understood that other securing means could alternatively be employed, such as snap fasteners and the like. The important feature is that the side walls are relatively elongated thereby to provide a comfortable carrying handle, and can be quickly and easily detachably locked to each other when the carrying handle is to be used.

I claim:

1. A carrying handle for packages or the like which is made of flexible and resilient plastic material and which can be moved from an open, stored position to a folded, use position, comprising a pair of vertically elongated side walls separated by and integrally connected to a generally semicylindrical retainer section the outer surface of which serves as the carrying surface of the handle in use, each of said side walls having at their adjacently disposed ends a generally C-shaped resilient retainer portion adjacent the bottom thereof which together form a generally V-shaped channel at their abutting edges, the free ends of said retainer portions being spaced from said semicylindrical section and from each other when said handle is open thereby to define a retaining area into which a rope or handle can be positioned after passage through said channel, and mating closure means formed on said side walls which cooperate when the side walls are folded to removably secure the same thereby conditioning said handle for use, said side walls when thus folded forming a smooth continuation of said semicylindrical retainer section thereby to facilitate carrying of said handle, the closing of said side walls serving to move the free ends of said retainer portions toward the confronting surface of said semicylindrical retainer section and into engagement therewith and with each other, thereby locking said rope or handle in said retaining area until said handle is opened.

2. The handle of claim 1 wherein said closure means on said side walls comprise a series of ribs and grooves formed on said side walls, said ribs frictionally engaging the grooves on the other side wall for removably closing said side walls and thus said handle.

3. The handle of claim 2 wherein said ribs and grooves are formed on the inner surfaces of the outer free ends of said side walls.

4. The handle of claim 1 wherein each of said side walls is formed with longitudinally extending grooves thereby to enhance the flexibility of said handle in use to more precisely conform to the hand of the user.

5. A carrying handle for packages and the like which is made of flexible and resilient plastic material and which can be moved from a generally flat, stored position to a folded, use position, comprising a pair of elongated side walls separated by and integrally connected to a generally semicylindrical center section which partially defines a retaining area for a rope or handle, one of said side walls having integrally formed lateral retaining members which are hinged to said side wall for movement between a flat position generally in the plane of said side wall and a folded position generally normal to said side wall, each of said retaining members being formed with a curved passage the end of which opens in the outer surface of said retaining member, the subsequent folding of said retaining members to a position generally normal to said side wall and the folding of said side walls toward each other serving to tightly confine said retaining members against the opposed side walls, and closure means provided on the confronting surfaces of said side walls for detachably closing said side walls thereby forming said handle.

6. The handle of claim 5 wherein said closure means on said side walls comprise a series of ribs and grooves formed on said side walls, said ribs frictionally engaging the grooves on the other side wall for removably closing said side walls and thus said handle.

7. The handle of claim 6 wherein said ribs and grooves are formed on the inner surfaces of the outer free ends of said side walls.

8. The handle of claim 6 wherein said ribs and grooves are formed on said side walls generally laterally of said retainer members when said handle is in use.

9. The handle of claim 5 wherein each of said side walls is formed with longitudinally extending grooves thereby to enhance the flexibility of said handle in use to more precisely conform to the hand of the user.

10. A carrying handle for packages or the like which is made of flexible and resilient plastic material, comprising a pair of elongated side walls each of which has a main wall portion integrally joined at one end thereof and free end portions overlaying one another to form a semicylindrical bottom section for carrying the handle, one of said side walls having a pair of separate, generally C-shaped resilient retainer members having abutting edges, the free ends of said retainer members being spaced from said semicylindrical section thereby to define therewith a retaining area into which a rope or handle can be positioned, and mating closure means formed on said side walls which cooperate when the side walls are folded to removably secure the same thereby conditioning said handle for use, the closing of said side walls locking said rope or handle in said retaining area until said handle is opened.

11. The handle of claim 10 wherein said closure means on said side walls comprise a series of ribs and grooves formed on said side walls and disposed laterally of said retainer members when the side walls are removably secured together, said ribs frictionally engaging said grooves for removably closing said side walls and thus said handle.

12. A carrying handle for packages and the like which is made of flexible and resilient plastic material, comprising a pair of elongated side walls each of which has a main wall portion integrally joined at one end thereof and free end portions adapted to overlay one another to form a semicylindrical bottom section for carrying the handle, one of said side walls having integrally formed lateral retaining members which are hinged to said side wall for movement between a flat position generally in the plane of said side wall and a folded position generally normal to said side wall, each of said retaining members being formed with a curved passage the end of which opens in the outer surface of said retaining member, the subsequent folding of said retaining members to a position generally normal to said side wall and the folding of said side walls toward each other serving to tightly confine said retaining members against the opposed side walls, and mating closure means provided on said side walls for detachably closing said side walls thereby forming said handle.

13. The handle of claim 12 wherein said closure means on said side walls comprise a series of ribs and grooves formed on said side walls and disposed laterally of said retainer members when the side walls are removably secured together, said ribs frictionally engaging said grooves for removably closing said side walls and thus said handle.

14. A carrying handle for packages and the like which is of flexible and resilient plastic material, comprising a pair of elongated side walls each of which has a main wall portion integrally joined at one end thereof and free end portions overlaying one another to form a semicylindrical bottom section for carrying the handle, said semicylindrical bottom section further providing a retaining area for a handle of an article to be carried, and closure means provided on the confronting faces of overlapped sections of said side walls relatively adjacent said semicylindrical bottom section for detachably connecting said side walls thereby to form said carrying handle.

15. A carrying handle for packages or the like which is made of flexible and resilient plastic material, comprising a pair of elongated side walls integrally joined at one end, each of said side walls being formed with separate, generally C-shaped resilient retainer sections which are in contact engagement with each other when said handle is closed in use, one of said side walls extending downwardly substantially beyond the retainer section thereof and overlapping the other side wall thereby to define a generally semicylindrical retaining area into which the article to be carried can be positioned between said retainer sections, said mating closure means formed on said side walls which cooperate when said one side wall is folded to overlap as aforesaid to removably secure the same thereby conditioning said handle for use, the closing of said side walls locking said article in said retaining area until said handle is opened.

16. A carrying handle for packages or the like which is made of flexible and resilient plastic material and which can be moved from an open, stored position to a folded, use position, comprising a pair of vertically elongated side walls separated by and integrally connected to a curved retainer section the outer surface of which serves as the carrying surface of the handle in use, each of said side walls having resilient retainer portions which together form a channel at their abutting edges, the free ends of said retainer portions being spaced from said curved retainer section and from each other when said handle is open thereby to define a retaining area into which a rope or handle can be positioned after passage through said channel, and mating closure means formed on said side walls which cooperate when the side walls are folded to removably secure the same thereby conditioning said handle for use, said side walls when thus folded forming a continuation of said curved retainer section thereby to facilitate carrying of said handle, the closing of said side walls serving to move the free ends of said retainer portions toward the confronting surface of said curved retainer section and into engagement therewith and with each other, thereby locking said rope or handle in said retaining area until said handle is opened.

* * * * *